United States Patent
Chinn et al.

(10) Patent No.: US 7,346,767 B2
(45) Date of Patent: Mar. 18, 2008

(54) METHOD AND APPARATUS FOR MANAGING RESOURCE ACCESS IN CONFIGURING A PLURALITY OF COMPUTERS

(75) Inventors: Richard D. Chinn, Seattle, WA (US);
Jason E. Robarts, Redmond, WA (US);
Jeromy S. Statia, Duvall, WA (US);
William D. Wasserstrum, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 383 days.

(21) Appl. No.: 11/119,873

(22) Filed: May 2, 2005

(65) Prior Publication Data
US 2006/0248534 A1 Nov. 2, 2006

(51) Int. Cl.
*G06F 15/177* (2006.01)

(52) U.S. Cl. .............................. 713/100; 713/1; 713/2; 709/220; 709/221; 710/10; 710/104

(58) Field of Classification Search ................. 713/1, 713/100
See application file for complete search history.

(56) References Cited

U.S. PATENT DOCUMENTS

| | | | | |
|---|---|---|---|---|
| 6,105,098 A | * | 8/2000 | Ninose et al. | 710/200 |
| 6,343,338 B1 | * | 1/2002 | Reneris | 710/200 |
| 6,725,457 B1 | * | 4/2004 | Priem et al. | 718/104 |
| 6,820,122 B1 | * | 11/2004 | Mandler et al. | 709/226 |
| 2002/0194251 A1 | * | 12/2002 | Richter et al. | 709/105 |
| 2005/0240585 A1 | * | 10/2005 | Makhervaks et al. | 707/8 |

* cited by examiner

*Primary Examiner*—Nitin C. Patel
(74) *Attorney, Agent, or Firm*—Wolf, Greenfield & Sacks, P.C.

(57) ABSTRACT

A method and apparatus for configuring a plurality of computers, each of which requires interaction with at least one resource to advance a configuration state of the computer. A request for access to a resource may be received from at least one of the computers, and a resource needed may be determined. An availability of the resource needed may be determined, and the computer instructed to interact with the resource if the resource is available. If the resource is not available, the computer may be caused to not interact with the resource.

20 Claims, 2 Drawing Sheets

METHOD AND APPARATUS FOR MANAGING RESOURCE ACCESS IN CONFIGURING A PLURALITY OF COMPUTERS

BACKGROUND OF INVENTION

1. Field of Invention

This invention relates to configuring computers.

2. Related Art

The deployment of large numbers of computers typically requires significant effort to configure all of the computers to be suitable for the service that each is intended to provide. For example, a large organization seeking to deploy 1000 or more new computers for use in its operation will typically require that the computers be configured before being deployed in the field. Frequently, this task falls upon the computer provider, systems integrator or other vendor.

Prior approaches to configuring relatively large numbers of computers, e.g., 100, 1000 or more computers, required an operator to determine each computer's current configuration state and initiate interaction of the computer with an appropriate resource for each step in the configuration process. This process, when performed for 1000 or more computers, was known to take 3-6 or more months to complete.

SUMMARY OF INVENTION

Aspects of the invention provide a method and apparatus for administering a configuration process for a plurality of computers. In one embodiment, a configuration process for a large number of computers, e.g., 1000 computers, managed in accordance with aspects of the invention may be completed in a time that is significantly less (3-4 days) than what was previously required (3-6 months).

In one embodiment, a configuration process for a plurality of computers may be managed by one or more administrators, e.g., a computer system operating one or more software modules. Each computer requiring configuration may send a request to the administrator, e.g., indicating a current configuration state of computer. The administrator may determine what resource the computer should next interact with to advance the computer's configuration state, and then determine if the needed resource is available. If the resource is available, the administrator may direct the computer to interact with the resource. If the resource is not available, the administrator may place the computer into a queue for the resource, such that the computer may be directed to interact with the resource when it becomes available. When a computer has completed its interaction with a resource, the computer may update its configuration state, e.g., update a suitable file including information regarding the configuration processes completed by the computer, and indicate the completion to the administrator. The administrator may again determine the computer's configuration state, determine what resource is next needed, determine the resource's availability, and direct the computer appropriately.

The administrator may manage the configuration process for a plurality of computers so that the overall configuration process is managed in an efficient way. For example, the administrator may have limited resources for use in the configuration process. The administrator may identify bottlenecks or other situations where a certain resource type may be responsible for delay in the configuration process. Where possible, the administrator may increase the number of resources available, such as by at least temporarily assigning certain computers to be resources for the configuration process. The administrator may also identify particular resources that have a limited capacity to receive requests from computers for configuration state advancement, and limit the number of computers that try to access those resources, e.g., to avoid the resource "locking up" or otherwise denying service to all computers because of a request overload.

Another aspect of the invention involves the ability of an administrator to control the ultimate configuration state of some or all computers in the process. This may provide for flexibility in overcoming problems during configuration, allow for control over the final configuration state of computers, and/or allow for control over the order in which the computers complete their respective configuration processes. For example, a mass configuration process may involve the configuration of 1000 computers in which most of the computers ultimately have the same final configuration state. Others, however, may have different final configuration states. Although these other computers may have a different final configuration state from most of the other computers, all of the computers may require many of the same configuration processes, such as installation of an operating system, storage of directory information, etc. The administrator may direct the computers to perform the common configuration processes first, and thereafter cause certain ones of the computers to perform more specialized processes so as to achieve a desired final configuration state. Also, the administrator need not operate such that the final configuration state for each individual computer is known beforehand. Instead, the administrator may determine the final configuration state of each computer during the configuration process. In this way, if a problem arises in the configuration of one computer during the process, the administrator can readily direct another computer to follow configuration processes to replace the problem machine. For example, one of the computers having a special final configuration state may have a mechanical failure just before completing its configuration. The administrator may direct another computer already engaged in the configuration process to proceed with specific configuration processes to take the failed machine's place.

In one aspect, the invention provides a method for configuring a plurality of computers, where each of the computers requires interaction with at least one resource to advance a configuration state of the computer. The resources may be a source of software code, a source of database records or other data, or other information needed to configure a computer for an intended use. A request for access to a resource may be received from at least one of the computers, and a resource needed for the at least one computer may be determined based on the request. An availability of the resource needed for the at least one computer may be determined, and the computer instructed to interact with the resource if the resource is available. If the resource is not available, the computer may be caused to not interact with the resource. By managing a configuration process so that resources are not overloaded with requests, but yet are not laid idle for longer than necessary, a configuration process may be efficiently completed.

In another aspect of the invention, a computer system for administering a configuration for a plurality of computers includes a configuration administrator that receives requests from each of the computers for access to a resource. Each of the computers may require interaction with at least one resource to advance a configuration state of the computer, e.g., so that the computer may reach a final configuration state. The configuration administrator may be adapted to determine a configuration state of each computer requesting access to a resource and to determine an availability of the resource. The configuration administrator may permit a computer access to a requested resource if the resource is available, but deny the computer access to the requested resource if the resource is unavailable.

These and other aspects of the invention will be apparent from the following description.

BRIEF DESCRIPTION OF THE DRAWINGS

Aspects of the invention are described below with reference to the drawings in which like numeral reference like elements, and wherein.

DETAILED DESCRIPTION

Aspects of the invention are described below with reference to illustrative embodiments. It should be understood that reference to these illustrative embodiments is not made to limit aspects of the invention in any way. Instead, illustrative embodiments are used to aid in the description and understanding of various aspects of the invention. Therefore, the following description is intended to be illustrative, not limiting.

Aspects of the invention are described below with reference to a plurality of computers that are configured to operate, at least in part, as domain controllers. However, it should be understood that aspects of the invention may be used in any suitable configuration process, not just a process for configuring domain controllers. Also, it should be understood that the computers may experience any suitable operation(s) during a configuration process, such as software installation (including an operating system or other software), data file storage, hardware installation, password or other security-related information may be established (such as a logon user name or access password), communication or other operation-related settings may be established, and so on. Configuration processes may require one- or two-way communication between a computer and one or more resources and/or physical interaction with the computer (such as a technician installing particular hardware).

Figure 1:
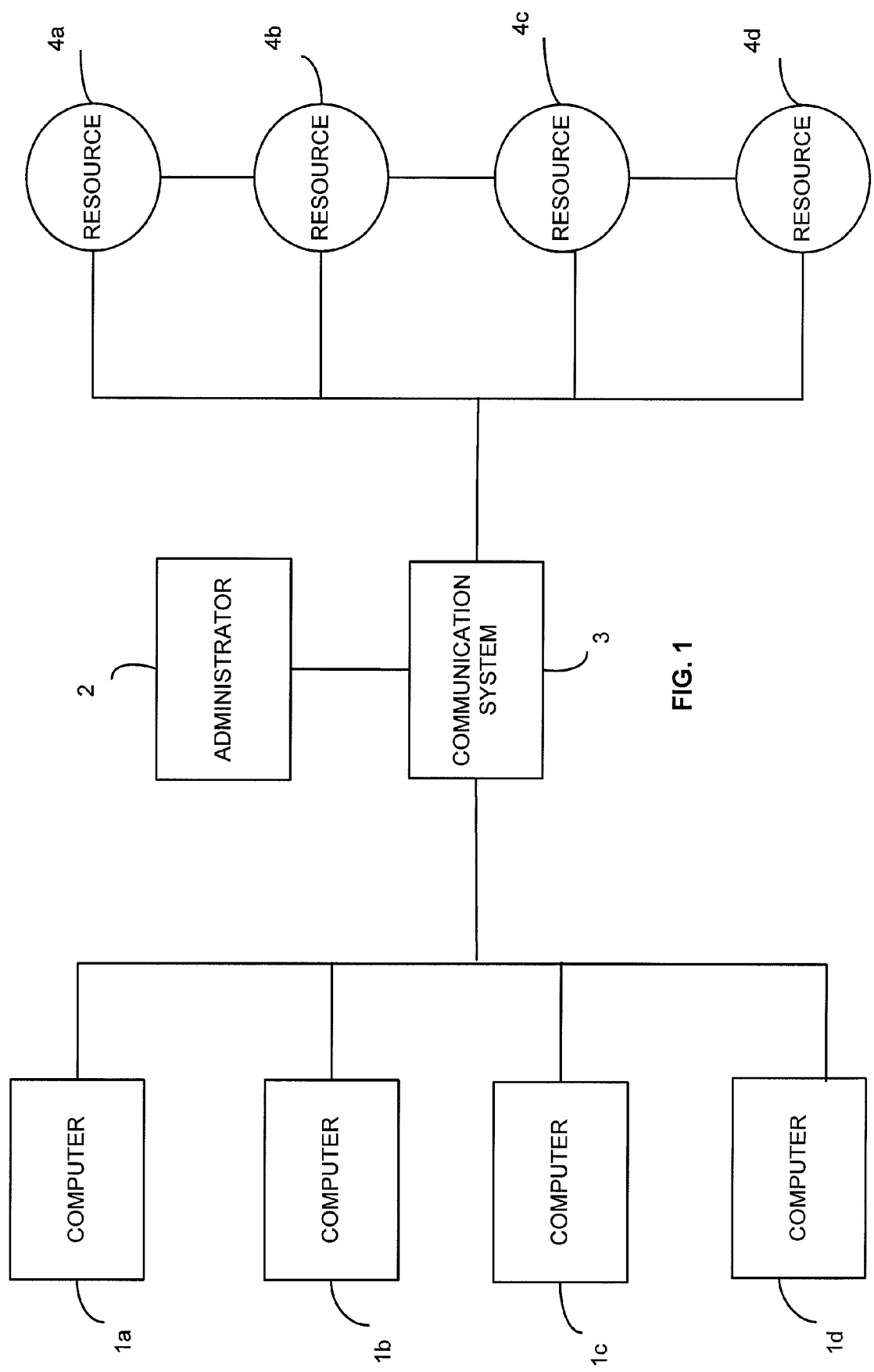
FIG. 1 is a schematic diagram of a plurality of computers, configuration administrator and plurality of resources in an illustrative embodiment.

FIG. 1 shows a schematic diagram of a plurality of computers 1 that can communicate with an administrator 2 and a plurality of resources 4 via a communication network 3 in such a way that the computers 1 may engage in a configuration process. In this illustrative embodiment, four computers 1a-1d and four resources 4a-4d are shown, but any number of computers 1 and/or resources 4 may be involved in a configuration process. The computers 1 may be any suitable type of general purpose, programmable data processing device that includes any suitable components, such as one or more processors, data storage devices, communication devices or other interfaces, display devices (printer, CRT or other visual display, etc.), user input devices (keyboard, mouse, touch screen, voice input, etc.), software, and so on. The communication network 3 may include any suitable communication arrangement or combination of arrangements, such as a local area network (LAN), a wireless LAN, the Internet, a telephone network, dedicated wired or wireless links, combinations thereof, and so on. Thus, the computers 1, administrator 2 and resources 4 may be geographically local to each other, or may be geographically separated in any way.

The administrator 2 may include one or more computers or other devices arranged to perform the input/output and other functions of the administrator. The computer(s) may include any suitable hardware and/or software, such as one or more software modules operating on one or more general purpose computers, and may be arranged to receive input from one or more operators. The resources 4 may be any suitable resource needed by the computers 1 to advance their configuration state, such as programmed computers, data storage devices, etc., arranged to provide suitable interaction with a computer to perform at least part of a configuration process.

In this illustrative embodiment, the administrator 2 may simultaneously manage a configuration process for 100, 1000 or more computers (although only four computers 1 are shown in FIG. 1). Each of the computers 1 may send a request to the administrator 2 for authorization to access a resource so as to advance the computer's configuration state. This request may be in the form of a file or other information that is sent from the computer to the administrator and includes information regarding the computer's current configuration status, as well as other information, such as the identity of the computer. Alternately, the request may include a specific request from the computer for access to a particular resource or type of resource, such as when the computer itself assess which resource it next needs to interact with and so indicates to the administrator. The request may be sent at the initiative of the computer, or may be sent in response to an inquiry from the administrator 2. For example, the administrator 2 may send a command to the computers 1 asking the computers 1 to send current configuration status information. The computers 1 may respond, thereby requesting access to a resource.

Based on the request, the administrator 2 may determine what resource 4 is needed to advance the configuration state of each requesting computer 1. The administrator 2 may make this determination based on a comparison of the computer's current configuration state to a planned configuration process for the computer. The planned configuration process may list a plurality of configuration steps and resources that the computer needs to interact with at each step to arrive at a final configuration state. The planned configuration process may be unique to the computer, or may be a process that is used, at least in part, by many or all of the other computers. For example, computers in a configuration process may all need to perform configuration steps A, B, C and D. However, after completing steps A-D, some computers may need to perform steps E, F and G to arrive at a first final configuration, and other computers may need to perform steps F, H and I to arrive at a second final configuration. Thus, all of the computers may initially instructed to perform the common configuration steps A-D, and then computers may be selected to branch off and perform different configuration steps (E, F and G or F, H and I) to arrive at a desired final configuration.

Based on the comparison of the computer's current configuration state with a planned configuration process, the administrator 2 may determine what resource 4 the computer should interact with to advance its configuration state, and then determine whether the resource 4 is available. Using the example above, if a computer has completed steps A and B of the configuration process, the administrator may determine that the computer should next perform step C. A resource 4 may include one or more devices that a computer may interact with to advance its configuration state. For example, one resource may be a file replication service that allows a computer to receive and store one or more data files, such as a directory listing. The resource may include one or more devices that one or more computers may communicate with to receive the data files. Thus, when the administrator 2 determines whether the resource is available, the administrator 2 may determine whether any of the devices associated with the resource 4 are able to interact with the computer 1.

If a resource 4 needed by the computer 1 is available, the administrator 2 may instruct the computer 1 to interact with the resource 4, and may direct the computer 1 to interact with a particular resource or component of the resource. Interaction of the computer 1 with the resource 4 may include a request for file(s) or other information, which may be provided by the resource 4 via the communication network 3 to the computer 1. Once interaction between computer and the resource is completed, the computer may update its current configuration status, e.g., update a file to include information that the computer interacted with the resource and advanced its configuration state. Alternately, the computer 1 and/or resource 4 may notify the administrator 2 that the interaction is complete and the computer's configuration state advanced. The administrator 2 may store information to this effect and/or direct the computer to store suitable information. Thereafter, the computer 1 may again request the administrator for access to a resource to further advance its configuration state.

If a resource is not available, the administrator 2 may cause the computer 1 to not interact with a resource 4. A resource 4 may not be available for many different reasons. For example, a resource may have a limited capacity to handle interaction requests from computers 1. In some cases, a resource 4 may "lock up" or otherwise be unable to handle any configuration requests from computers 1 if the resource 4 receives more than a threshold number of requests. The administrator 2 may know this threshold number, and manage computer requests for interaction with the resource 4 so that failures do not occur. The administrator 2 may also balance the load of resources 4 so that the interaction with computers is shared between resources. This may help speed computer/resource interactions, thus speeding the overall configuration process.

When a resource 4 is unavailable for a computer 1, the administrator 2 may take any suitable action to cause the computer 1 to not interact with the resource 4. For example, the administrator 2 may command the computer 1 to standby until further notice. The administrator 2 may place the computer 1 in a queue for access to the resource 4 and release the computer when other computers ahead of it in the queue are cleared, e.g., the computers ahead in the queue have completed interaction with the resource or the resource is otherwise made available. The administrator 2 may place a computer's denied request in a pool of other denied requests that are periodically checked by the administrator 2 to see if the needed resource 4 is available. As opposed to a queue in which requests from computers seeking access to the same resource 4 are grouped together, a pool may include computer requests for access to different resources or resource types. Moreover, computer requests in the pool need not be checked by the administrator 2 in any particular order, such as an order in which the requests were placed in the pool. Instead, the administrator 2 may check the requests based on any criteria, such as checking the requests for higher priority computers more frequently than other lower priority computers.

The administrator 2 may take action to add or remove resources 4 to the configuration process as it determines necessary. For example, if the administrator 2 determines that more resources of a particular type are needed, the administrator 2 may designate certain ones of the computers 1 to be resources of a particular type or otherwise associate additional resources to the configuration process. This ability may be useful, for example, in cases where a large number of computers need to share a common file or other set of information. Once a computer has stored the necessary file, the computer may act as a resource and provide the needed file or other information with other computers. The administrator 2 may also remove resources 4 from the process as they are not needed. For example, if a computer 1 had been designated as a resource 4, but the computer 1 is no longer needed in that role, the administrator 2 may remove the computer 1 as a resource. This may allow the administrator 2 to expand and contract resources 4 as necessary to most efficiently manage the configuration process.

The administrator 2 may also control the configuration process of the computers 1 in any suitable way so as to cause each computer 1 to arrive at any desired final configuration state. For example, a configuration process involving 1000 computers may require that 900 of the computers have a first final configuration, and the remaining 100 computers each have a second final configuration state. At the beginning of the configuration process, it may not be precisely determined which of the 1000 computers will have the second final configuration state, and which will have the first final configuration state. The administrator 2 may cause all of the computers to initially follow a common configuration process so that all of the computers have a same configuration state as far into the configuration process as possible. Using the example above, the administrator may direct all of the computers to engage in process steps A-D. The administrator 2 may determine during the configuration process which 100 computers will branch off on a different process so as to arrive at the second configuration state, e.g., which computers will engage in steps F, H and I. This may provide for flexibility in the configuration process. For example, if the 100 computers having the second configuration state are higher priority computers than the other computers, the administrator 2 may designate the first 100 computers to reach a critical point in the configuration process (e.g., those computers having completed steps A-D) to branch off onto a process (e.g., for performing steps F, H and I) so that these 100 computers end up with the second final configuration. This may help ensure that the computers having the second final configuration state complete the configuration process first, e.g., so they may be deployed before the remaining computers have completed their configuration processing. As another example, if one of the 100 computers destined to have the second final configuration experiences a catastrophic failure, the administrator 2 can assign one of the 900 computers destined for the first final configuration state to take the place of the failed computer.

Although in the example above, the computers performing a configuration process either have a first or second final configuration at the end of the process, it should be understood that the administrator may manage processes in which all of the computers have the same final configuration, or processes in which all of the computers have a different final configuration. Also, although the administrator is capable of managing configuration processes in which individual computers do not necessarily have their final configuration states determined at the start of a configuration process, the administrator may know the final configuration state for all computers at the start and cause the computers to follow a corresponding configuration process.

Also, in the above embodiment, computers request access to each resource needed to advance a configuration state of the computer. However, the configuration process may allow for computers to access resources without requesting authorization from the administrator. For example, a computer may have a hardware device installed without requesting access from the administrator to the resource, e.g., technician installed hardware resource. Thus, in some embodiments, the administrator may only control access to certain resources, while computers are free to access other resources as needed.

Figure 2:
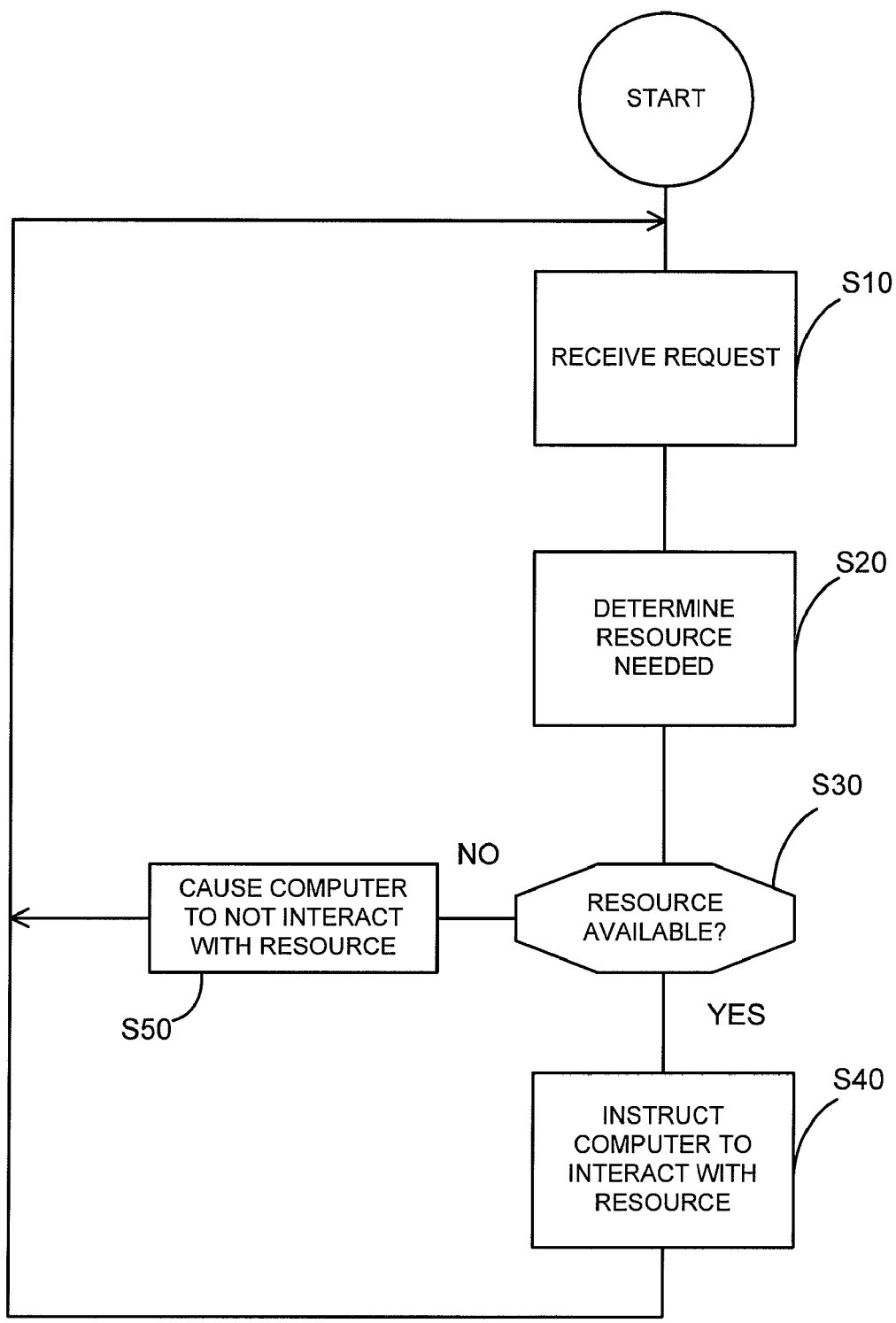
FIG. 2 is a flow chart of a method for managing configuration requests in an illustrative embodiment.

FIG. 2 shows a flow chart of steps in a method for managing a configuration process for a plurality of computers. In step S10, a request for access to a resource is received. The request may be received at an administrator 2, which may include a computer system operating one or more software modules. The request may be provided by one or more computers and may include a file or other set of information that indicates a current configuration state of the computer(s). The request may be made at the instruction of the administrator, e.g., the administrator may instruct the computer(s) to provide a file or other information indicating the computer's current configuration state. Alternately, the computer(s) may provide the request automatically, such as after completing interaction with a resource, a resource may send the request after completing a configuration interaction with a computer, or the request may be generated internally at the administrator (the administrator may generate a request to itself indicating that a computer requires interaction with a resource). Requests generated internally by the administrator may be made in response to any suitable criteria, such as an indication from a resource that interaction with a computer is complete.

In step S20, a resource needed for the computer(s) to advance its(their) configuration state is determined. The administrator may determine what resource is needed based on information indicating the current configuration state of the computer(s), such as from a file provided by the computer(s) or from information stored by the administrator. A current configuration state of the computer(s) may be compared to a planned configuration process for the computer(s) and a needed resource identified based on the comparison. The planned configuration process may require the computer interact with resources in a specific order, or may allow computers to interact with resources in a random or otherwise uncontrolled order, e.g., based on the availability of resources. For example, a configuration process may require that a computer interact with Resource 1, then Resource 2, then Resource 3, in that order. Alternately, a configuration process may require that a computer interact with Resource 1, Resource 2, and Resource 3, but allow the computer to interact with the resources in any order. Based on the planned configuration process and process steps that have been completed by the computer, a determination regarding what resource is needed may be made. This determination may be made by the administrator or by the computer itself. The administrator or computer may use configuration process maps or lists that are specific for the individual computer when determining which resource is needed by a computer, or may use configuration process information that is generic to a plurality of computers in the configuration process. This information may be applicable to the entire configuration process for the computers, e.g., where the computers will all have a same final configuration state, or may be applicable to a portion of the configuration process for the computers, e.g., where the computers have different final configuration states, but engage in common configuration steps for at least a portion of the overall configuration process.

The administrator may store a plurality of configuration maps or lists for different configuration processes, and assign computers to selected configuration maps or lists while the configuration process is ongoing so as to change or establish the final configuration state for each computer during the configuration process. Thus, although the administrator may know prior to the start of a configuration process that certain numbers of computers will perform specific configuration processes, the administrator may not necessarily know which individual computers, e.g., based on their MAC addresses, will have a specific final configuration state. Instead, the administrator may determine the final configuration state, and thus the configuration process steps, for each computer during the configuration process.

In step S30, a determination is made whether the needed resource is available. An administrator may make this determination based on any suitable information, such as a whether the resource is currently interacting with one or more computers, a maximum number of computers a resource is capable of interacting with at a given time, whether the resource actually exists or not, and so on. (If a resource does not exist, the administrator may take action to associate a resource with the configuration process, or take steps to create the resource, such as by designating one of the computers to function as a resource.)

If the resource is available, in step S40, the computer is instructed to interact with the resource to advance the computer's configuration state. This interaction may involve any suitable activity, such as the computer receiving software code, database records or other information from a resource, installing software code for operation, setting operation parameters, and so on. In short, interaction with the resource may involve one- and/or two-way communication between the computer and the resource, as well as processing or other action at the computer, e.g., to install software code as suitable. The computer may also update a file or otherwise store information representing that the computer has completed interaction with the resource and is ready for a next step in the configuration process. Alternately, the computer or resource may notify the administrator that the interaction is complete, and the administrator may cause information regarding the computer's current configuration state to be recorded, e.g., in the computer and/or at the administrator.

In step S50, if the resource is not available, the computer may be caused to not interact with the resource. For example, the administrator may instruct the computer to not interact with the resource and request that the computer standby for further instructions. Alternately, the administrator and/or computer may generate another request for a different resource (in step S10), which if available, may be interacted with by the computer. In another embodiment, the administrator may place the computer in a queue with other computers waiting for the availability of a particular resource, and release the computer for interaction with the resource when the resource is available. The administrator may also place the computer's request in a pool of denied requests that are checked by the administrator. The administrator may check requests in the pool based on any criteria, such as a length of time that the request is in the pool, a priority level of the computer relative to other computers having requests in the pool, and so on.

Steps S10-S50 may be repeated as necessary to manage a plurality of computers that are simultaneously engaged in a configuration process. Thus, the administrator may receive a plurality of requests from a plurality of computers for access to a plurality of resources, and manage the requests and resource access as needed to efficiently manage the use of resources.

While the invention has been described in conjunction with specific embodiments thereof, it is evident that many alternatives, modifications, and variations will be apparent to those skilled in the art. Accordingly, embodiments of the invention as set forth herein are intended to be illustrative, not limiting. Various changes may be made without departing from the spirit and scope of the invention.

The invention claimed is:

1. A method for configuring computers, comprising:
   (a) providing a plurality of computers, each of the plurality of computers requiring interaction with at least one resource to advance a configuration state of the computer, and none of the plurality of computers including information regarding a final configuration state for the computer;
   (b) receiving an electronic signal from at least one of the plurality of computers representing a request for access to a resource;
   (c) determining, based on the request, a resource needed for the at least one computer;
   (d) determining an availability of the resource needed for the at least one computer;
   (e) instructing the at least one computer to interact with the resource if the resource is available;
   (f) causing the at least one computer to not interact with the resource if the resource is not available; and
   repeating steps (b)-(f) as appropriate for the plurality of computers to achieve a final configuration state for the plurality of computers, thereby making the plurality of computers suitable for a service each of the computers is intended to provide.

2. The method of claim 1, further comprising:
   updating a configuration state of each computer when each computer has interacted sufficiently with a resource so as to advance the configuration state of the computer.

3. The method of claim 1, wherein the step of determining a resource needed for at least one of the plurality of computers comprises:
   assessing a current configuration state of the at least one computer.

4. The method of claim 3, wherein the assessing step is performed based on a file including information regarding the configuration state of the at least one computer.

5. The method of claim 4, wherein the file is provided by the at least one computer.

6. The method of claim 1, wherein a final configuration state for the plurality of computers is identical for the plurality of computers.

7. The method of claim 1, wherein each of the plurality of computers requires interaction with a plurality of different resources to reach its final configuration state.

8. The method of claim 1, wherein a final configuration state for at least two of the plurality of computers is different.

9. The method of claim 1, wherein the plurality of computers comprises at least 100 computers, and the final configuration state for each of the plurality of computers is undetermined after performing steps (b) though (e) at least once for one of the computers.

10. A computer system for administering a configuration process for a plurality of computers, the system comprising:
    a configuration administrator that receives requests from each of the plurality of computers for access to a resource, each of the plurality of computers requiring interaction with at least one resource to advance a configuration state of the computer and none of the plurality of computers including information regarding a final configuration state for the computer to make the computer suitable for a service the computer is intended to provide, the configuration administrator being adapted to determine a current configuration state of each computer requesting access to a resource and determine an availability of the resource, the configuration administrator permitting a computer access to a requested resource if the resource is available, and denying the computer access to the requested resource if the resource is unavailable,
    wherein the configuration administrator determines a final configuration state for each of the plurality of computers after at least one of the computers accesses a requested resource to advance its configuration state.

11. The system of claim 10, wherein the configuration administrator receives information regarding a current configuration state from each computer requesting access to a resource, and the configuration administrator determines a resource required for the computer based on its current configuration state.

12. The system of claim 10, wherein each computer determines when an interaction with a resource is complete and advances the computer's configuration state.

13. The system of claim 12, wherein at least some of the plurality of computers access a resource to advance a configuration state without requesting the configuration administrator for access to the resource.

14. The system of claim 10, wherein a final configuration state for the plurality of computers is identical for the plurality of computers.

15. The system of claim 10, wherein each of the plurality of computers requires interaction with a plurality of different resources to reach a final configuration state.

16. The system of claim 10, wherein a final configuration state for at least two of the plurality of computers is different.

17. The system of claim 10, wherein the plurality of computers comprises at least 100 computers.

18. The system of claim 10, wherein at least some of the plurality of computers are configured to function as a domain controller upon reaching a final configuration state.

19. The system of claim 10, wherein the configuration administrator places requests for access to a resource in a pool of denied requests when the requested resource is not available.

20. The system of claim 19, wherein the pool includes a plurality of queues with each queue corresponding to one of a plurality of resources, each queue including a list of computers waiting for access to the corresponding resource.

* * * * *